Patented Nov. 30, 1943

2,335,605

UNITED STATES PATENT OFFICE 2,335,605

PREPARATION OF β-ALANINE

Joseph H. Paden, Glenbrook, and Philip M. Kirk, Stamford, Conn., assignors to American Cyanamid Company, New York, N. Y., a corporation of Maine No Drawing. Application June 25, 1942, Serial No. 448,487

10 Claims. (Cl. 260—534)

This invention relates to a method for the preparation of amino acids from alkoxynitriles and ammonia and more particularly, to a method of preparing beta-aminopropionic acid (beta-alanine) from a beta-alkoxy-propionitrile and ammonium hydroxide.

In accordance with the present invention we have discovered that amino acids may be produced directly from alkoxynitriles by a relatively simple and easily controlled reaction in a single operation. It is an advantage of the present invention that the only reactants essential for the operation of the process are an alkoxynitrile and ammonium hydroxide. It is a further advantage of the present invention that the amino acids are produced directly from the alkoxynitrile without requiring the isolation of any intermediate product. It is also an advantage of the invention that amino acids are obtained in good yields and in a form which permits them to be easily separated from the reaction mixture.

Beta-aminopropionic acid (beta-alanine) has recently become an important intermediate for use in the preparation of pantothenic acid. The production of beta-alanine is therefore a preferred embodiment of our invention since it results in a cheaper method for the production of a very pure form of beta-alanine than the processes employed heretofore. When the process of our invention is employed for the production of beta-alanine, an alkoxypropionitrile is heated with an ammonium hydroxide solution at a temperature of about 200° C. for a period of time in a pressure vessel. The temperature and the period of time for heating may be varied to a considerable extent. For reasons of economy we usually prefer to use temperatures within the range of from about 180° C. to about 225° C. and a period of time ranging from one to eight hours. The beta-alanine produced by the above reaction may be isolated as such or converted to an acid salt such as hydrochloride or an alkali metal or alkaline earth metal salt and isolated as the salt.

The invention will be further illustrated in connection with the following specific examples. It should be understood, however, that the examples are for the purpose of illustration only and the invention is not limited to the details set forth therein. The parts are by weight unless otherwise stated.

Example 1

A mixture of 189 parts (2.2 mols) of beta-methoxypropionitrile and 1680 parts of 10% ammonium hydroxide was heated to 200° C. for four hours in a pressure vessel. It was then treated with charcoal, at about 70° C., cooled, and filtered. The filtrate was evaporated to a syrupy consistency or until the water had been removed and diluted with 600 parts of methanol whereupon beta-alanine crystallized and was recovered by filtration. The yield was 58 parts or 30% of theory.

Example 2

The procedure of Example 1 was followed with the addition of 2 parts of diphenylamine to the mixture to act as a corrosion inhibitor. Beta-alanine was again obtained in crystalline form and in substantially the same yield.

Example 3

432 parts (4.4 moles) of beta-ethoxypropionitrile and 1591 parts of 5% ammonium hydroxide were heated at 197° C. for four hours in a pressure vessel. The resulting mixture was treated with charcoal, cooled and filtered and the filtrate evaporated to a syrupy consistency. Upon dilution with methanol, beta-alanine crystallized and was recovered by filtration, the yield being about 30%.

Example 4

50.2 pounds (0.59 mol) of beta-methoxypropionitrile and 229 pounds of 10% ammonium hydroxide were heated at 150–165° C. for 8.5 hours. The solution was filtered, evaporated to a dry syrup, and the syrup diluted with methanol. On filtration, 2.1 pounds of beta-alanine representing a 4% yield were obtained.

Example 5

A solution of 29.7 pounds of beta-ethoxypropionitrile and 202 pounds of 20% ammonium hydroxide was heated at 195° C. for four hours in a pressure vessel. The resulting mixture was treated with charcoal, cooled and filtered. The filtrate was evaporated to a syrupy consistency and diluted with 3 gallons of methanol whereupon beta-alanine crystals were obtained in about 29% yield.

Example 6

The filtrates from the beta-alanine recovery steps of Examples 1 through 5 were evaporated to reclaim the methyl alcohol. The thick syrupy residues when re-worked gave additional yields of beta-alanine. A representative run on the residue was as follows:

226 parts of the residue were added to 600 parts of 28% ammonia and 1080 parts of water. The mixture was heated at 200° C. for four hours and the beta-alanine recovered as in previous examples. The yield was about the same as a corresponding run on beta-methoxypropionitrile, the yield being 24% as compared to 26%.

It appears that an equilibrium is reached in the reaction between the beta-alkoxypropionitrile and the aqueous ammonia, which may account for the fact that after the beta-alanine is removed, the residue can again be treated with ammonium hydroxide to produce further quantities of beta-alanine. When over-all yields are considered this is extremely important because yields approaching the theoretical may be obtained in re-working the residues.

In addition to the tests described in the specific examples a number of further reactions were carried out wherein the strength of the ammonium hydroxide solution was varied from 2 to 28% and wherein the proportion of beta-alkoxypropionitrile based on the proportion of ammonia was also varied. In these further experiments the temperatures employed were varied from 150° to 250° C. and the time of heating was varied from one to twenty-four hours. In all of these experiments beta-alanine was readily obtained. The yields of beta-alanine may be increased to as high as 50-60% by employing low concentrations of beta-alkoxypropionitriles. The increased cost of removing the larger volumes of solvent in isolating the product, however, may decrease the economical advantages resulting from the increased yields.

As mentioned heretofore in this specification, the beta-alanine produced by our process may, if desired, be converted to the acid salt, such as the hydrochloride or the salt of a metal such as an alkali metal or an alkaline earth metal salt, and isolated in the form of the salts. We prefer, however, to isolate the beta-alanine directly from the concentrated syrupy reaction product by diluting with absolute methanol. Methanol is peculiarly suited for this isolation or crystallization step because we have found that various other aliphatic alcohols, such as ethanol or propanol, do not produce satisfactory results. When the beta-alanine is crystallized from the methanol mixture, it is in a pure form and may then, if desired, be converted to the salts when it is required that the salts of beta-alanine be utilized as intermediate in processes for producing pantothenic acid.

In the reaction between beta-alkoxypropionitriles and ammonium hydroxide, under the conditions described above, it may be desirable in some instances to add other substances to the reaction mixture. For example, a dehydration catalyst might be added or an ammonium salt of a weak acid, such as for example ammonium carbonate, inhibitors, antioxidants, or other suitable reagents for slightly altering the course or speed of the reaction.

The present invention is concerned primarily with the production of beta-alanine involving a reaction between a beta-alkoxypropionitrile and aqueous ammonia and which permits the beta-alanine to be separated therefrom by simply diluting with anhydrous methanol. Similar processes, however, may be carried out in which alkoxynitriles other than beta-alkoxypropionitriles are employed for reacting with ammonia to produce the corresponding amino acids. Similarly, it may be possible to utilize substituted amines (e. g., alkyl, alkylol, aryl) instead of the ammonia for the production of substituted beta-alanine or substituted amino acids.

The present invention is in no sense limited to the use of beta-methoxypropionitrile and beta-ethoxypropionitrile in the preparation of beta-alanine as described in the specific examples and other beta-alkoxy-propionitriles such as beta-propoxypropionitrile, beta-butyroxypropionitrile, etc., may be substituted therefor without departing from the spirit of the invention.

This application is a continuation in part of our copending application, Serial No. 413,570, filed October 3, 1941.

We claim:

1. The process of producing beta-aminopropionic acid which comprises reacting a beta-alkoxyproprionitrile with aqueous ammonia at a temperature of at least 150° C. and lower than the temperature at which substantial decomposition of beta-aminopropionic acid occurs.

2. The process of producing beta-aminopropionic acid which comprises reacting a beta-alkoxypropionitrile with aqueous ammonia at a temperature of from about 180° C. to about 225° C.

3. The process of producing beta-aminopropionic acid which comprises heating at a temperature of about 200 C. a mixture of a beta-alkoxypropionitrile and aqueous ammonia for from about one to twenty-four hours.

4. The process of producing beta-aminopropionic acid which comprises heating at a temperature of about 200° C. a mixture of beta-methoxypropionitrile and aqueous ammonia for about four hours.

5. The process of producing beta-aminopropionic acid which comprises reacting a beta-alkoxypropionitrile with aqueous ammonia at a temperature of from 180° C. to 225° C. for a period of from one to twenty-four hours, concentrating the reaction mixture to a syrup and diluting with methanol to cause precipitation of beta-aminopropionic acid.

6. The process of producing beta-aminopropionic acid which comprises heating at a temperature of about 200° C. a mixture of a beta-alkoxypropionitrile and aqueous ammonia for from about one to twenty-four hours, concentrating the reaction mixture to a syrup and diluting with methanol to cause precipitation of beta-aminopropionic acid.

7. The process of producing beta-aminopropionic acid which comprises heating at a temperature of about 200° C. a mixture of beta-methoxypropionitrile and aqueous ammonia for about four hours, concentrating the reaction mixture to a syrup and diluting with methanol to cause precipitation of beta-aminopropionic acid.

8. The process according to claim 1 in which the residue produced by reacting a beta-alkoxypropionitrile with aqueous ammonia is reacted with a fresh quantity of aqueous ammonia at an elevated temperature to produce a further quantity of beta-aminopropionic acid.

9. The process of producing beta-aminopropionic acid which comprises reacting a beta-alkoxypropionitrile with aqueous ammonia at a temperature of from 180° C. to 225° C. for a period of from one to twenty-four hours, concentrating the reaction mixture to a syrup and diluting with methanol to cause precipitation of beta-aminopropionic acid, collecting said beta-aminopropionic acid, concentrating the residue and reacting said residue with aqueous ammonia at a temperature of from 180° C. to 225° C. for a period of from one to twenty-four hours to produce further quantities of beta-aminopropionic acid.

10. The process of producing beta-aminopropionic acid which comprises heating at a temperature of about 200° C. a mixture of a beta-alkoxypropionitrile and aqueous ammonia for from about one to twenty-four hours, concentrating the reaction mixture to a syrup and diluting with methanol to cause precipitation of beta-aminopropionic acid, collecting said beta-aminopropionic acid, concentrating the residue and reacting said residue with aqueous ammonia at a temperature of about 200° C. for about four hours to produce a further quantity of beta-aminopropionic acid.

JOSEPH H. PADEN.
PHILIP M. KIRK.